United States Patent
Netzer

(10) Patent No.: US 10,639,995 B2
(45) Date of Patent: May 5, 2020

(54) METHODS, CIRCUITS, DEVICES, SYSTEMS AND ASSOCIATED COMPUTER EXECUTABLE CODE FOR DRIVER DECISION SUPPORT

(71) Applicant: GT Gettaxi Limited, Limassol, H.E. (CY)

(72) Inventor: Yuval Netzer, Tel Aviv (IL)

(73) Assignee: GT GETTAXI LIMITED, Limassol (CY)

( * ) Notice: Subject to any disclaimer, the term of this patent is extended or adjusted under 35 U.S.C. 154(b) by 0 days.

(21) Appl. No.: 16/199,528

(22) Filed: Nov. 26, 2018

(65) Prior Publication Data

US 2019/0092171 A1 Mar. 28, 2019

Related U.S. Application Data

(63) Continuation of application No. 15/706,724, filed on Sep. 17, 2017, now Pat. No. 10,160,321, which is a (Continued)

(51) Int. Cl.
*B60K 35/00* (2006.01)
*G08G 1/00* (2006.01)
(Continued)

(52) U.S. Cl.
CPC .......... *B60K 35/00* (2013.01); *G06Q 10/047* (2013.01); *G08G 1/096716* (2013.01);
(Continued)

(58) Field of Classification Search
CPC .......... B60K 35/00; G08G 1/20; H04W 4/046
(Continued)

(56) References Cited

U.S. PATENT DOCUMENTS 9,424,515 B2 * 8/2016 Atlas ........................ G06N 5/02
2012/0023033 A1 * 1/2012 Tomasz .................. G06Q 10/06
705/345

(Continued)

OTHER PUBLICATIONS

USPTO, Office Action for U.S. Appl. No. 14/926,016, dated Dec. 15, 2016.
(Continued)

*Primary Examiner* — Yazan A Soofi
(74) *Attorney, Agent, or Firm* — Lowenstein Sandler LLP

(57) ABSTRACT

Implementations are described for methods, circuits, devices, systems and associated computer executable code for providing driver decision making support. An apparatus of one implementation includes processor circuitry communicably coupled to a display and a driver interface, the processor circuit to execute a recommendation engine to generate a recommended driver action comprising driving directions for a route, wherein the recommended driver action is optimized according to the operational parameter, wherein the recommendation is at least partially based upon a location signal indicating a current location of the driver, and a rendering unit to render upon the display a graphic representation of the recommended driver action, wherein said traffic flow model and said transportation demand model are dynamic and intermittently updated and said transportation demand module is segmented by location.

20 Claims, 2 Drawing Sheets

Related U.S. Application Data continuation of application No. 14/926,016, filed on Oct. 29, 2015, now Pat. No. 9,776,512.

(60) Provisional application No. 62/077,761, filed on Nov. 10, 2014.

(51) Int. Cl.
| | | |
|---|---|---|
| *G08G 1/0967* | (2006.01) | |
| *G06Q 10/04* | (2012.01) | |
| *H04W 4/44* | (2018.01) | |
| *H04W 4/40* | (2018.01) | |
| *H04W 4/024* | (2018.01) | |

(52) U.S. Cl.
CPC .. *G08G 1/096741* (2013.01); *G08G 1/096775* (2013.01); *G08G 1/202* (2013.01); *H04W 4/40* (2018.02); *H04W 4/44* (2018.02); *H04W 4/024* (2018.02)

(58) Field of Classification Search
USPC .......................................................... 701/36
See application file for complete search history.

(56) References Cited

U.S. PATENT DOCUMENTS

| | | |
|---|---|---|
| 2013/0144831 A1 | 6/2013 | Atlas |
| 2015/0219464 A1 | 8/2015 | Beaurepaire et al. |
| 2015/0371157 A1 | 12/2015 | Jaffe |

OTHER PUBLICATIONS

USPTO, Notice of Allowance for U.S. Appl. No. 14/926,016, dated May 30, 2017.
USPTO, Office Action for U.S. Appl. No. 15/706,724, dated Feb. 8, 2018.
USPTO, Notice of Allowance for U.S. Appl. No. 15/706,724, dated Jul. 30, 2018.
USPTO, Notice of Allowance for U.S. Appl. No. 15/706,724, dated Oct. 11, 2018.

* cited by examiner

METHODS, CIRCUITS, DEVICES, SYSTEMS AND ASSOCIATED COMPUTER EXECUTABLE CODE FOR DRIVER DECISION SUPPORT

CROSS-REFERENCE TO RELATED APPLICATIONS

This Application is a continuation application of U.S. patent application Ser. No. 15/706,724, filed Sep. 17, 2017, which is a continuation application of U.S. patent application Ser. No. 14/926,016 filed Oct. 29, 2015 and issued as a U.S. Pat. No. 9,776,512 on Oct. 3, 2017, which claims the benefit of U.S. Provisional Patent Application No. 62/077,761 filed on Nov. 10, 2014, by the inventors of the present application, where each of the aforementioned applications are hereby incorporated by reference in their entirety.

TECHNICAL FIELD

The disclosure generally relates to the field of mobile communication devices. More specifically the disclosure relates to methods, circuits, devices, systems and associated computer executable code for providing driver decision making support.

BACKGROUND

Drivers of car services such as Taxis, Black cars, Limos and transportation networks (such as Uber™, Lyft™ and Sidecar™ drivers) spend almost half their time driving a vacant car (see e.g. NYC 2014 taxicab factbook). These miles are referred to as "dead miles" and cost the driver (lost income, waste of fuel), the passengers (wasted wait time) and society (unnecessary road congestion and pollution). During this time, drivers typically face a slew of options and must make many different decisions on a typical day. For example, each time they drop-off a passenger, they have many options on what to do next. They mostly make these decisions based on their intuition and past experience. Thus, improving this decision making process will result in increased utilization profitability of drivers and car service fleets as well as mitigation of the problems described above.

Example: a NYC yellow cab driver can select several different routes to cruise searching for the next passenger, or can alternatively drive to a nearby taxi station. Another type of driver, such as one who drives in a transportation network (such as an UberX™ driver driving with Uber's™ mobile application), which works in a system which matches supply and demand based on proximity of drivers to passengers, can select a standpoint in which he believes he has a high chance of getting the next passenger as soon as possible. He may sometimes prefer a distant point with a high probability of getting a passenger over a closer point which he believes is less probable of getting a passenger soon. Such a driver has plenty of inputs available which provide information he can rely on in his decisions, and which are used in order to decide on all of these questions, eventually, however, the decision he makes is largely based on intuition and not on a true analysis of the situation.

Some car service companies provide their drivers with notifications of areas in which demand appears to exceed supply (such as Uber's™ surge pricing driver notification), thus signaling drivers to prefer a location in which they are more likely to catch a passenger soon. This is done based on real time knowledge of passengers requesting drivers in areas in which the company cannot match all demand by available supply.

Some other companies (such as Gett™) display on a map locations of previous collected passengers in order to hint towards location which are more likely to gain a short wait for the driver of an empty cab.

In both cases the companies only show information and signals which can help the driver in decision making but do not provide detailed suggestions of what to do next in order to optimize the driver's performance and decision making process.

SUMMARY

Implementations of the disclosure include methods, circuits, devices, systems and associated computer executable code for providing driver decision making support. According to some embodiments, there may be provided a driver decision support system (hereinafter also referred to as a "DDSS") which may generate action recommendations to a commercial driver, such as a taxi driver, a cab driver, a limo driver or any other kind of driver who picks up and transports passengers or cargo on an ad hoc (or otherwise flexible/uncertain) basis (hereinafter collectively referred to as: "Cdrivers").

The recommendation system may generate recommendations with regard to actions a Cdriver should take or avoid based on one or more factors including: (1) one or more optimization parameters defined by a Cdriver/user, preprogrammed or defined by a relevant profile indicating which operational parameter(s) (e.g. maximize Cdriver personal profit, maximize fleet profit, minimize average passenger wait time, etc.) the Cdriver would like a recommendation optimized to and/or weights to assign different operational parameters; (2) real-time traffic feeds for one or more optional operating territories; (3) a traffic flow model for each of the one or more optional operating territories; and./or (4) one or more probabilistic transportation supply and/or demand model(s) which may predict demand and./or supply for different types of transportation (e.g. passenger, cargo, package, etc.), optionally updated and/or modified to account for the time of day and/or day of the week and/or relevant data received from external sources (e.g. local event data, local third party driver service data, weather forecasts, road congestion, etc.). According to some embodiments, the one or more probabilistic transportation demand models may also predict likely destinations for passengers or cargo picked up from specific geographic locations during specific times of day and/or the expected profit the driver will gain as well as the expected time of travel and driver costs (e.g. fuel, tolls, etc.).

According to some embodiments, a driver decision support system may be constructed according to a server/client architecture, whereby an application running on a wireless client device carried by a Cdriver/user may communicate over a mobile communication network with a recommendation engine running on one or more servers.

According to some embodiments, a DDSS may comprise one or more client applications residing on mobile communication devices intended to be carried by Cdrivers or in their vehicles. The DDSS client applications may communicate over a communication network with one or more DDSS servers.

It should be understood that some or all the functions described herein as performed by a DDSS server may alternatively be performed by a DDSS client application and vice-versa. In other words, the division of functionalities between DDSS client applications and DDSS servers described herein is but one set of possible implementations of the disclosure, and any other division of functionalities between the two is equally possible based on logistic considerations (e.g. the nature of the communication network, the nature of the mobile devices and so on). Equally, a mixture of embodiments is possible, such that some mobile devices perform more functionalities and others rely more on functionalities performed at the servers. Any division of functionalities between the two is possible and should be considered within the scope of the present description.

According to some embodiments, DDSS servers (and/or client applications) may receive data relating to the driver decision making analysis they perform from external sources, proprietary or third party services. Such information may include:

a. Traffic reports (e.g. live traffic reports, user based traffic information, MTA reports, road segment level traffic speed data, etc.);

b. Weather reports, including live weather reports and/or weather forecasts;

c. Event'news reports (e.g. police reports, news feeds, event listings, accident reports, etc);

d. Cdriver related information, such as reports and/or alerts from commercial driving services (e.g. Uber™ surge pricing driver notification, Gett™ collection maps, etc.); and/or e. Any other relevant information available.

According to some embodiments, a DDSS may include a recommendation engine (residing on a DDSS server and/or a DDSS client application) designed to solve one or more optimization problems and produce one or more action recommendations for one or more Cdrivers, based on their current location, other relevant considerations and desired/ defined optimization criteria/considerations.

According to some embodiments, a DDSS may further include one or more modeling units designed to create, maintain and update one or more models of factors relevant to the desired action recommendations. Such modelling units may include:

a. A Traffic Flow Modeler designed to create models of traffic flow in one or more relevant areas. A traffic flow modeler may receive live traffic updates and event/ accident reports from exterior sources. A traffic flow modeler may use the live data to create models of current and future traffic flow in each of the one or more relevant areas. A traffic flow modeler may also include relevant traffic flow data; models relating to each of the areas in question and historic data which may be used for pattern learning. A traffic flow modeler may further include dynamic updating and refinement based on monitoring and pattern detection within the live traffic feeds and incident/accident detection and related consequence analysis;

b. A Cdriver Supply Vs. Demand modeler which may be designed to create models of supply vs. demand of Cdrivers in one or more areas and/or subareas, current and/or future. A Cdriver Supply Vs. Demand modeler may include a Cdriver demand modeler and a Cdriver supply modeler, each of which may collect the relevant data from exterior sources and create the relevant model to then be compared to its counterpart to create a supply vs. demand model. According to some embodiments, such demand/supply models may also be built/tuned using historical passenger pickup/dropoff locations and/or historical GPS routes of vacant and occupied trips. Alternatively, the supply and demand models may be combined into a single component. This component may be based directly on historical data observations and/or based on a probabilistic model (with parameters tuned using historical data) and may estimate the probability of a passenger pickup in each location/time given the state and/or all discussed external signals.

According to some embodiments, a DDSS may include graphic processing circuitry functionally associated with a rendering module, adapted to derive and render graphic representations of: data collected by the DDSS, analysis and models derived by the DDSS from collected data and/or recommendations/conclusions derived by the DDSS from the data and/or models and analysis. According to some embodiments, graphic representations may include maps illustrating the data collected by the DDSS, analysis and models derived by the DDSS from collected data and/or recommendations/conclusions derived by the DDSS.

According to some embodiments, a DDSS may further include a Cdriver interface and/or fleet manager interface designed to allow the Cdriver and/or fleet manager to input one or more desired recommendation criteria/preferences/ priorities by which to generate recommendations. Such an interface may further include options for the Cdriver and/or fleet manager to control operation and display of the DDSS (e.g. select display format).

According to some further embodiments of the disclosure, the principles of DDSS as described herein may be implemented for non-commercial drivers, with the relevant modifications. Accordingly, there may be provided DDSS adapted to provide recommendations to non-commercial drivers, based on one or more optimization criteria relating to non-commercial drivers, including: driving time, driving distance, traffic avoidance, fuel consumption, etc.

BRIEF DESCRIPTION OF THE DRAWINGS

The subject matter regarded as the disclosure is particularly pointed out and distinctly claimed in the concluding portion of the specification. Implementations of the disclosure, however, both as to organization and method of operation, together with objects, features, and advantages thereof, may best be understood by reference to the following detailed description when read with the accompanying drawings in which:

Figure 1:
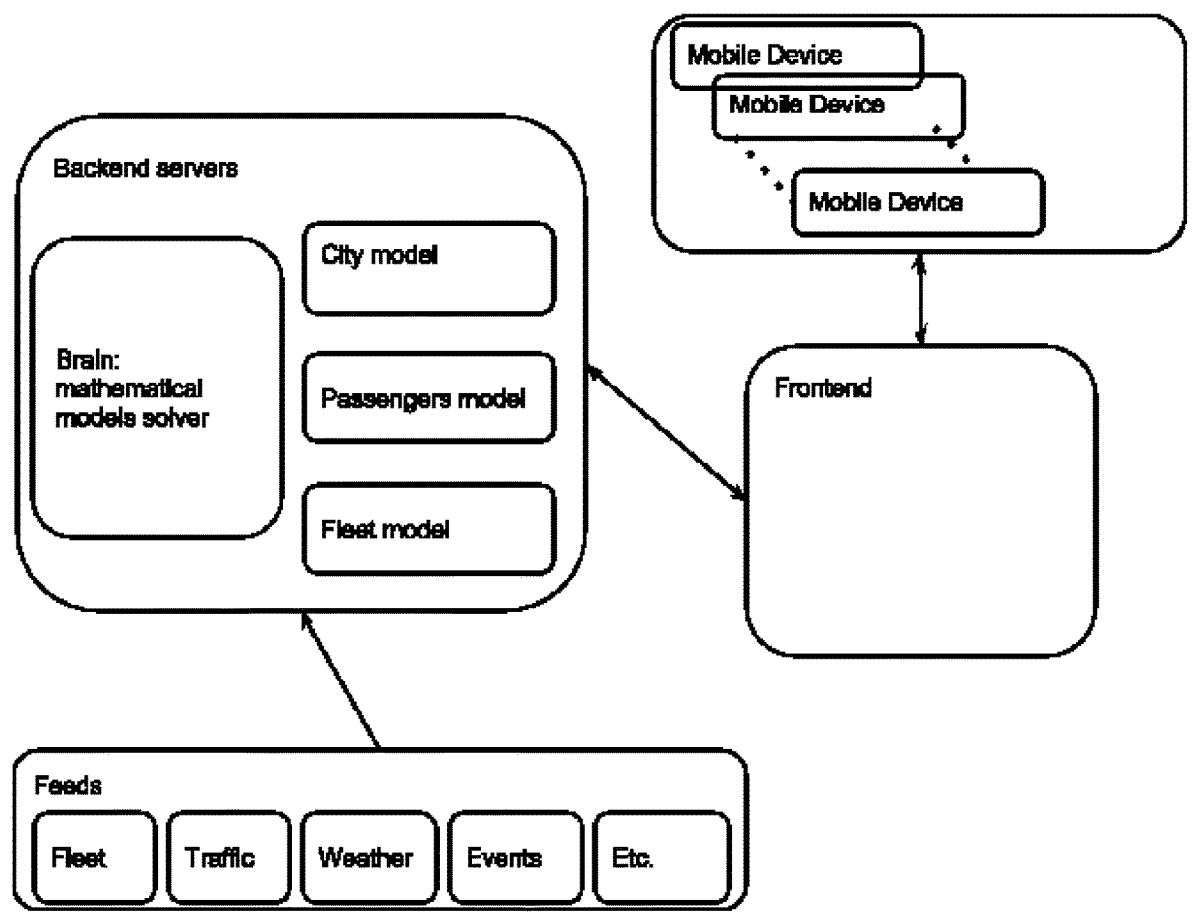
FIG. 1 is a block diagram of an exemplary DDSS, in accordance with some embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the disclosure.

DETAILED DESCRIPTION

In the following detailed description, numerous specific details are set forth in order to provide a thorough understanding of the aspects of the disclosure. However, it will be understood by those skilled in the art that the disclosure herein may be practiced without these specific details. In other instances, well-known methods, procedures, components and circuits have not been described in detail so as not to obscure the disclosure.

Unless specifically stated otherwise, as apparent from the following discussions, it is appreciated that throughout the specification discussions utilizing terms such as "processing", computing, "calculating", "determining", or the like, refer to the action and/or processes of a. computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The term server may refer to a single server or to a functionally associated cluster of servers.

Embodiments of the disclosure may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, memory cards (for example SD card), SIM cards, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer, communication device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the disclosure are not described with reference to any particular programming language or markup language. It will be appreciated that a variety of programming languages or techniques may be used to implement the teachings of the disclosure as described herein.

Functions, operations, components and/or features described herein with reference to one or more embodiments, may be combined with, or may be utilized in combination with, one or more other functions, operations, components and/or features described herein with reference to one or more other embodiments, or vice versa.

The disclosure includes methods, circuits, devices, systems and associated computer executable code for providing driver decision making support. According to some embodiments, there may be provided a DDSS (see FIG. 1) which may generate action recommendations to a commercial driver, such as a taxi driver, a cab driver, a limo driver or any other kind of driver who picks up and transports passengers or cargo on an ad hoc (or otherwise flexible/uncertain) basis (hereinafter collectively referred to as: "Cdrivers").

The recommendation system may generate recommendations with regard to actions a Cdriver should take or avoid based on one or more factors including: (1) one or more optimization parameters defined by a Cdriver/user, pre-programmed or defined by a relevant profile indicating which operational parameter(s) (e.g. maximize Cdriver personal profit, maximize fleet profit, minimize average passenger wait time, a combination of the above, etc.) the Cdriver would like a recommendation optimized to and/or weights to assign different operational parameters; (2) real-time traffic feeds for one or more optional operating territories; (3) a traffic flow model for each of the one or more optional operating territories; and/or (4) one or more probabilistic transportation supply and/or demand model(s) which may predict demand and/or supply for different types of transportation (e.g. passenger, cargo, package, etc.), optionally updated and/or modified to account for the time of day and/or day of the week and/or relevant data received from external sources (e.g. local event data, local third party driver service data, weather forecasts, etc.)

According to some embodiments, the one or more probabilistic transportation demand/supply models may also predict likely destinations for passengers or cargo picked up from specific geographic locations during specific times of day and/or the expected profit the driver will gain as well as the expected time of travel and driver costs (e.g. fuel, tolls, etc.). According to some embodiments, the one or more probabilistic transportation demand/supply models may also predict the expected profit the driver will gain from pickups based on several criteria, such as: time of day, day of week, pickup location, weather, congestion, etc.

According to some embodiments, the one or more probabilistic transportation demand models may also predict costs associated with trips such as the expected time of travel and operating costs such as fuel, tolls, etc.

According to some embodiments, a driver decision support system may be constructed according to a server/client architecture, whereby an application running on a wireless client device carried by a Cdriver/user may communicate over a mobile communication network with a recommendation engine running on one or more servers. According to some embodiments, DDSS servers may include backend servers and/or frontend servers, both of which may be dedicated servers and/or cloud based computing infrastructures.

According to some embodiments, a DDSS may comprise one or more client applications residing on mobile communication devices intended to be carried by Cdrivers or in their vehicles (e.g. smartphone, tablet, laptop, car media system/screen, a dedicated device, etc). The DDSS client applications may communicate over a communication network with one or more DDSS servers.

According to some embodiments, a DDSS may superimpose recommendations to drivers on a map which may be specific to each driver based on a solution to the optimization problem defined by the current optimization criterion as well as: his location, the location of other drivers, the expected locations of potential future passengers and the current conditions (such as current road congestion and weather which may impact both demand and supply). A. DDSS may show the driver the best action, route, combination of actions, etc. (or several potential alternatives ranked or scored by several relevant metrics such as expected profit or expected time till pickup of next passenger) to perform at each moment Such recommendations may be updated continuously according to the selections of the driver. According to some embodiments, recommendations may be presented to the driver when he is not driving a passenger and he has a choice between many different options such as: standing at a taxi stop to wait for passengers, standing at a location in which he is likely to be selected by an e-hail dispatch system such as Uber$^{Thr}$ or Gett™ as the nearest driver or as a close enough driver—i.e. in systems which use proximity based dispatch (in this case the preference may be to stand in a location which is very likely to be close to an expected future passenger, possibly also considering available supply) or any other dispatch system based on proximity (location based service), cruising one of exponentially many different routes, searching for hailing passengers, any combination of the above, going off for a break or finishing the shift.

According to some embodiments, DDSS servers (and/or client applications) may receive data relating to the driver decision making analysis they perform from external sources, proprietary or third party services. Such information may include:
   a. Traffic reports (e.g. live traffic reports, user based traffic information, MTA reports, etc.);
   b. Weather reports, including live weather reports and/or weather forecasts;
   c. Event news reports (e.g. police reports, news feeds, event listings, accident reports, airport takeoffs/landings, etc);
   d. Cdriver related information, such as reports and/or alerts from commercial driving services (e.g. Uber.™ surge pricing driver notification, Gett™ collection maps, etc.); and/or
   e. Locations of other. Cdrivers, either belonging to the same fleet and/or other fleets;
   f. Any other relevant information available.

According to some embodiments, a DDSS may include a recommendation engine (residing on a DDSS server and/or a DDSS client application) designed to solve one or more optimization problems and produce one or more action recommendations for one or more Cdrivers, based on their current location, other relevant considerations and desired/defined optimization criteria/considerations.

According to some embodiments, a DDSS may include a recommendation engine (residing on a DDSS server and/or a DDSS client application) designed to solve action recommendations that maximize for one or more Cdrivers the probability of picking up a passenger with a target destination in a selected region and a selected time selected by the driver.

According to some embodiments, a DDSS may further include one or more modeling units designed to create, maintain and update one or more models of factors relevant to the desired action recommendations, Such modelling units may include:
   a. A Traffic Flow Modeler designed to create models of traffic flow in one or more relevant areas. A traffic flow modeler may model at the regional level or at the road segment level traffic. A traffic flow modeler may receive live traffic updates and event/accident reports from exterior sources. A traffic flow modeler may use the live data to create models of current and future traffic flow in each of the one or more relevant areas. A traffic flow modeler may also include relevant traffic flow data/models relating to each of the areas in question and historic data which may be used for pattern learning. A traffic flow modeler may further include dynamic updating and refinement based on monitoring and pattern detection within the live traffic feeds and incident/accident detection and related consequence analysis;
   b. A Cdriver Supply Vs. Demand modeler which may be designed to create models of supply vs. demand of Cdrivers in one or more areas and/or subareas, current and/or future. A Cdriver Supply Vs. Demand modeler may include a Cdriver demand modeler and a Cdriver supply modeler, each of which may collect the relevant data from exterior sources and create the relevant model to then be compared to its counterpart to create a supply vs, demand model. According to some embodiments, such demand/supply models may also be built/tuned using historical passenger pickup/dropoff locations and/or historical GPS routes of vacant and occupied trips. In such models the demand and supply may be modeled separately and/or modeled as a demand/supply ratio combined. Furthermore, separate models (or modifications of models) may be provided based on whether the system is designed for drivers picking up hailing passengers, e-hailing passengers, or both types of passengers.

Figure 2:
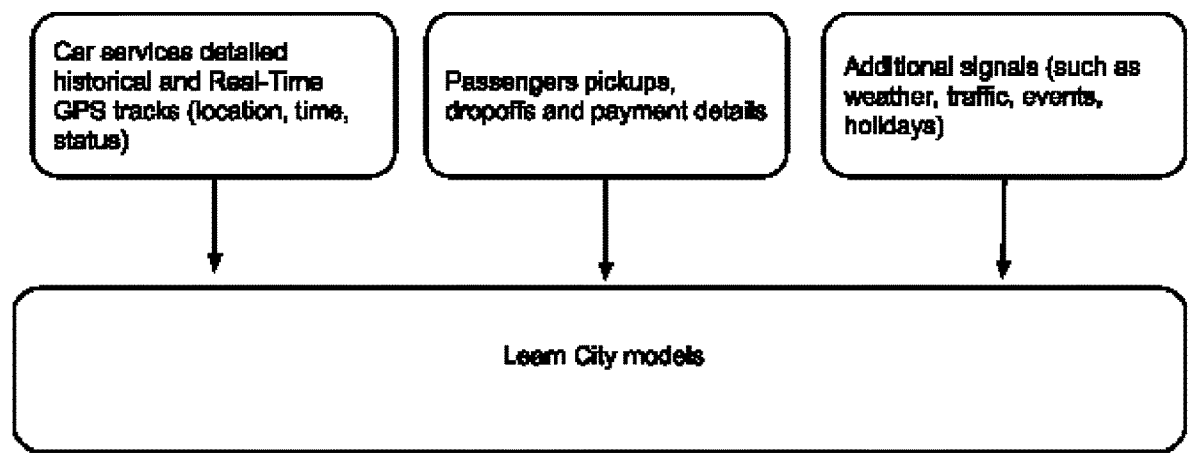
FIG. 2 is a flowchart including steps of operation of an exemplary DDSS, in accordance with some embodiments of the disclosure.

According to some embodiments, modeling units of a DL)SS may reside on backend servers and may run batch processes in which for each city/region a model is being learned. According to some embodiments, one or more cities/areas may be combined, dependent on the size of the area in which the driver/fleet works as well as the amount of data related to the region available. Refer to FIG. 2 for an overview of such a city model learning flow. Such a city model may be based on a geographical information system (GIS) which may include a vectorial map. Such a model may answer queries such as:
   a. city topology—how a car can drive from each location to any other location in the region;
   b. typical driving time and conditions from any location in the region to any other location, given current day and hour, weather, traffic conditions and any other related information (such as special events, holidays, etc.). This information could be learned using machine learning models from historical data (e.g. by a supervised classifier/regressor which is trained with historical drive times under different conditions between different points), may be learned by the DDSS based on data collected by the client applications during the work of the associated Cdrivers, and/or may be provided by a service provider or a custom commercial product; and/or
   c. what is the predicted probability of a passenger interested in a Cdriver service being present in a given street segment at a given day/hour under current conditions (such as weather, traffic, events being held or businesses density in a given location). This data may be learned from historical passenger data, which may be public data (such as in NYC), may be learned by the DDSS based on data collected by the client applications during the work of the associated Cdrivers, and/or private data collected by private drivers or car service companies. Alternatively, it may be calculated from data driven probabilistic models (e.g. classical demand supply models from Queueing theory) based on parameters learned from historical data, or tuned by hand. A different model may be learned for hailing passengers (passengers stopping a cab on the road or in taxi stands) and e-hailing passengers (passengers using mobile applications such as Gett® or Uber's™ mobile app to order a driver). See further details on learning a passenger model below and in FIG. 2.

According to some embodiments, learning a city model may include using GPS data of Cdrivers operating in the region of interest and, given a vector map of the city represented as a graph, expected time of driving from any point A to any point B in the region can be determined by using a shortest path algorithm over learned travel time of each graph edge and/or by learning, using historical data, the travel time between any two nodes of the graph, or areas in the region of interest, directly.

According to some embodiments, learning a passenger model may include estimating the probability that a Cdriver in a given situation (i.e. at a given location under given circumstances) and given a specific action (such as standing in a specific spot or cruising a specific road segment) will pick up a new passenger. Using historical pickup and dropoff details of passengers who were taken in the past, standard supervised learning algorithms may be used, such as nearest neighbors, logistic regression, artificial neural networks or support vector machines (or any other Machine Learning algorithm), to model the probability of a Cdriver picking up a passenger, on a specific route location, given current conditions such as time of day, day of week, traffic, weather, probabilistic supply/demand models and/or any other relevant data, which may be evaluated using standard feature engineering and cross validation techniques. This may be done in relation to both passenger data collected from hailing passengers (picked up from the street or from dedicated pickup points such as taxi stands) as well as for passenger e-hailing a driver using a transportation network such as Getf® or Uber[1] which match passengers to close drivers. In both cases, taking into account the current supply (density of other drivers in the area) if accessible, such as in the case where a fleet with many Cdrivers knows the exact location of all of it's Cdrivers, may improve the estimation of the probability that taking a specific action in a given situation will lead the driver to find a new passenger. Alternatively or in addition to the above, a monte carlo simulation using historical data. may be used in a simulated environment to estimate these probabilities. An example of the results of a supply vs. demand model can be seen in FIG. 4. As can be seen, in this example. the model results in a map of the city, wherein each location is color coded to represent the probability of finding a fare at that location.

According to some embodiments, building a city graph and associated passenger demand module may include:
a. representing the graph ("city graph") with a sparse adjacency matrix, the graph may be a directed graph wherein each node in the graph represents a city junction (or a sub-junction to take into account turn restrictions which require "splitting" junctions), and an edge between 2 nodes exists if a street connects those two junctions (the nodes and edges can be extracted from any source (e.g. Openstreetmap.com™), as shown in FIG. 3,
b. assigning trips to edges, wherein a trip is assigned to any edge within a defined distance of the pickup site (i.e. a single trip may be assigned to more than one edge);
c. For learning e-hailing demand models, each pickup may be associated with all edges that fall within the dispatch radius. According to further embodiments, edges may receive a weighted score based on their distance from the pickup spot (the closer they are, the higher their weight is),
d. This can be performed for all hours and/or each edge may be split into different time slices and learn the supply and/or demand in each edge as a function of time or any other parameter used (such as traffic, weather, events, etc.);
e. standard regression models may be used, using any tempo-spatial feature representation, to learn models for:
  i. Pickup probability—probability of a pickup in a location/time, considering all relevant data available;
  ii. Demand—number of passengers waiting for a pickup at a location/time, considering all relevant data available;
  iii. Supply—number of competing cars relvant in an area/edge/time, considering all relevant data available;
  iv. Dropoffs—distribution of dropoffs given a pickup location/time of day, considering all relevant data available;
  v. Travel time—expected travel time between any two locations as a function of time, considering all relevant data available; and/or
  vi. Trip price—expected amount of money paid by a passenger for a trip between any two locations as a function of time (including tips and extras), as well as associated costs (such as tolls and gas price), considering all relevant data available.
f. models may be modified and/or tuned to account for further factors: such as weather, traffic, events, etc.

According to some embodiments, DDSS backend servers, DDSS front end servers and/or DDSS client applications may also solve optimization problems to generate recommendations for Cdrivers. Each feasible [location, action] tuple in the region may be scored by a value function combining some or all of the models discussed. The actions associated with each location which are being scored may be any possible action by a Cdriver, e.g. example: cruising to another location (adjacent nodes in the city graph), standing in place, cruising to a nearby taxi stand, travelling to another area, etc. Such a scoring function may be used to select the best next action or the best set of actions the driver should take to optimize his expected future profits and/or any other criterion selected by the driver or by the fleet to guide optimization. This can be done using many different optimization methods such as greedy selection, approximate or exact dynamic programming algorithms such as described in the reinforcement learning literature: value iteration, policy iteration or TD-Learning, or with classical artificial intelligence algorithms used for solving planning problems under uncertainty (or in probabilistic models). The algorithms may be model based (i.e. the learned city and Cdriver demand vs. supply models may be used explicitly to solve the optimization problem) or model-free (the value of states and actions is learned directly without modeling of the state-action transition distributions such as with the well known 'ID-Learning or TD-Lambda algorithms). See more details for solving the optimization problem below.

A simplistic example of a value function which could be calculated by value iteration may be:

Let s be the location in the city, a the action available for drivers being examined (e.g. traversal of a street, standing in a specific location etc.), $P_{Pickup}(S, t, a)$ the probability of picking up a passenger while performing action a at location s at time t, $P_{DropOff(s, t, .)}$ the distribution of dropoff for pickups at locations at time t, Reward (s, t) the expected reward of picking up a passenger at location s at time t, T(s, a, s') be the time of traversing from s to s', starting at t, s(a) the deterministic outcome state of taking action a at state s, then:

$$V(s,t) = \max_a [P_{Pickup}(s,t,a)*\text{Reward}(s,t) + E^{s'}_{-Dropoff(s, t,s')}*V(s', t+T(s,t,s')) + (1-P_{pickup}(s, t, a))*V(s(a), t+T(s, t, s(a)))]$$

Using this Exemplary Value Function, Model Optimal Actions for Each State and Time can be Derived.

According to further embodiments, the DDSS backend servers, D.DSS front end servers and/or DDSS client applications may incorporate additional information into the decision making process. These could be external inputs such as real time traffic, current weather and weather forecasts as well as the current locations of other cars from the same fleet or from other fleets who share their location publicly. The incorporation of this information can be done by injecting this information into the optimization problem by using heuristics (e.g. penalizing pickup points in which the number of current drivers seems to be higher than the normal) and/or by increasing the size of the state space and learning the effect of actions under the different conditions separately.

According to some embodiments, the DDSS may generate recommendations with regard to actions a Cdriver should take or avoid based on one or more optimization parameters defined by a Cdriver/user, pre-programmed or defined by a relevant profile indicating which operational parameter(s) (e.g. maximize Cdriver personal profit, maximize fleet profit, minimize average passenger wait time, maximizing the probability a driver arrives close to a selected destination at a selected time etc.) the user would like a recommendation optimized to and/or weights to assign different operational parameters, including:
 a. Price or Profit of next trip;
 b. Profit per time period;
 c. Preference of type of fare (e.g. airport trips, longer/shorter trips, etc.)
 d. Locational preferences;
 e. Route type preferences (e.g. highway, residential, traffic avoidance, etc)
 f. Preferred fare search type (e.g. cruising, standing, airport, taxi stations)
 g. Any other relevant optimization parameter.

According to some embodiments, a DDSS may be further adapted to generate recommendations/strategies designed to increase the likelihood the driver will end up at a certain pre-defined location at a certain time. For example, a DDSS system may generate recommendations most likely to leave the Cdriver near his house at the end of a shift. Such optimization criteria may be factored in conjunction with other optimization considerations, at different possible weights, which may be adjustable. For example, two Cdrivers may set their respective DDSS systems to leave them near home at 18:00, or near the airport during day hours, etc. One of them, however, may set his system such that it will make sure to be near home at 18:00 even at the expense of reducing the likelihood of a profitable fare at 17:00 by 40%, whereas the other may decide that he would prefer not to reduce the likelihood of a profitable fare by more than 10% in order to arrive near home at 18:00.

According to some embodiments, the DDSS may generate recommendations with regard to actions a Cdriver should take or avoid also based on the Cdriver's current location and a traffic flow model for each of the one or more optional operating territories, which may be generated based on real-time traffic feeds for one or more optional operating territories. According to further embodiments, real time traffic feeds for an area may be analyzed based on area specific traffic models of traffic in the specific area. These area specific models may be generated based on:

a. historic traffic feeds of the area and their analysis,
 b. live traffic data relating to the area retrieved from drivers using the DDSS or another application collecting locational data;
 c. live traffic data relating to the area retrieved from third parties (e.g. Google
 d. 'Maps'),
 e. traffic flow models and feeds of neighboring areas,
 f. analysis of area specific parameters (e.g. road size, location of traffic lights, schools, etc.);
 g. events and accidents, in the area or neighboring areas;
 h. any other traffic related data available.

According to some embodiments, a traffic flow modeler may be implemented also using a combination of regression models (trained over historical trips) and real time traffic data combined with a Dijkstra algorithm over the city graph described above wherein weights of the edges are assigned according to the expected trip time in each edge.

According to some embodiments, the DDSS may generate recommendations with regard to actions a Cdriver should take or avoid also based on one or more probabilistic transportation supply vs. demand models which may predict demand and/or supply for different types of transportation (e.g. passenger, cargo, package, etc.). According to some embodiments, demand and/or supply models for different types of transportation may be constructed, modified, segmented and/or filtered by:
 a. Price or Profit of next trip;
 b. Preference of type of fare (e.g. airport trips, longer/shorter trips, etc.)
 c. Locational preferences;
 d. Time of day
 e. Day of the week
 f. f Time of year
 g. g. E-hail/street pickup Accordingly, supply vs. demand models may be tailored for particular circumstances by analyzing circumstance specific data (e.g. demand models for long rides on a rainy Tuesday afternoon in July, based on data from afternoons in the last 3 July's, as well as data from all rainy days as compared to other days to model the effect of the rain). According to some embodiments, circumstance specific models may be cross analyzed to simulate a particular set of circumstances at a particular point in time.

According to some embodiments, a DDSS may include front end servers (see FIG. 1), which interact with DDSS backend servers and DDSS client applications. Such frontend and/or backend servers may:
 a. serve queries which are generated by the mobile devices and sent to the front end servers (e.g. over a cellular network or any available internet connection which delivers the driver's location and other metadata);
 b. selects for a given driver that queries the system, different possible actions to take based on his location and current real time conditions such as road congestion, weather, real time demand and supply of passengers and drivers;
 c. score these different actions and factor the specific criterion of optimization for the specific Cdriver, which could be one that maximizes drivers personal profits, fleet overall performance, or passenger focused criterions such as average passenger waiting time or maximizing the probability of arrival at a requested destination at a certain time. The scoring of the different actions may be taken from the value function learned for different actions under different system conditions and may be delivered to each mobile device as suggested orders for the given Cdriver.

According to some embodiments, solving the above mentioned optimization problems in order to generate Cdriver recommendations may include a process built according to the following principles: Given: (1) a graph describing a city/region, where each node of the graph resembles a physical location (such as a junction, a location of interest or a potential car/taxi standpoint) and edges connecting the nodes represent possible routes between adjacent nodes, as shown in FIG. 3 and (2) a probabilistic model that factors one or more of the following: time of day, day of week, weather, traffic conditions, special events and models relating to both the travel time between nodes connected by edges (or by different routes) as well as the probability that an available Cdriver will encounter a passenger while traversing a specific route associated with an edge in the graph; selecting the optimal action for a Cdriver in a given location may be done using dynamic programming, or approximate dynamic programming as known in the art and described, for example, in the well known reinforcement learning literature. These algorithms may be used to valuate [state, action] tuples wherein, for example, a state may be an enumeration over locations in the city (nodes or edges in the graph), a time of day, a day of the week, etc. and the actions may be selections available for the driver (drive to an adjacent node/edge in the graph, stand in a potential stand point, etc). Alternatively, in the event that the model describing the transition between states is known or well approximated, one can set a value function dependent on the states and select the action that maximizes the expected value of the next state, which are equivalent to optional Cdriver actions given a state which describes a combination of the Cdriver's location and the current conditions (such as time of day, day of week, current traffic and weather). As a reward function (which is typically used in reinforcement learning), the actual payments may be logged in the Cdriver accounting logs and/or the expected payments as a function of distance traveled or time spent driving with/without a passenger could be easily estimated (including costs such as fuel) using real market information (e.g. tariff data). It is important to notice that these dynamic programming models naturally take into account future states and future expected profits and may not be greedy algorithms. For example, using dynamic programming, optimal action problem can be solved by calculating the expected profit of a driver over a fixed. (or diminishing) horizon for each of the optional actions at a given moment. The expected value of a driver doing action A. at time T may equal the expected immediate reward of doing action A at time T (as calculated from the passenger pickup probability model and expected profit model) plus the expected value of the values of the future states (weighted with the transition probabilities of the different future states and perhaps discounted over time in a diminishing horizon model).

According to further embodiments, the DDSS described herein may be used as part of an "artificial intelligence" or other form of computerized decision making system for autonomous or semi-autonomous vehicles/taxis. Such a system may allow non-professional drivers or driverless cars to act as Cdrivers by using the DDSS as a navigation planning system for the vehicle at the periods of time in which a passenger (or cargo) would like to sell transportation services.

According to some embodiments, surge pricing data (from external sources, other DDSS and/or the DDSS itself) may be fed into the models described herein and factored into the system recommendations and models.

According to some embodiments, DDSS may be used in conjunction by many drivers of a fleet and/or multiple fleets. Such DDSS may interact, share data and may further have a degree of central control or coordinated recommendations, such that the expected actions of other Cdrivers can be taken into account when performing recommendations. For example, when 10 Cdrivers are currently headed to a specific neighborhood, the 1 1$^{a'}$ driver may be recommended to go elsewhere, even if demand is currently relatively high in that area. Similarly, a driver may be sent to a remote area, even if demand there is very low, to make sure there is still service in that area if no other Cdrivers are close.

According to some embodiments, another optimization problem solution may be implemented in relation to e-hailing, in addition, combined with or instead of optimization problem solutions relating to regular hailing (street pickups). Optimization problem solutions relating to e-hailing may include selection of optimal Cdriver waning/standing points for e-hailing. Such processes may include one or more processes built according to the following principles: Given a continuous road segment and/or a large selection of junctions or car stand points (either manually created and/or automatically mined from pickup/dropoff or full GPS tracks of Cdrivers), selection of nodes of our graph model (the possible actions which are the set from which driver routes and stand points are selected) may be optimized by leveraging historical passenger pickup data to find the best possible stand/wait points (out of the infinite large number of options) as follows. for each potential location in the city (this may be done exhaustively using cloud computing, e.g. with mapreduce wherein optimization is done on a discrete set when enough computation power is available and/or by one or more gradient descent algorithms over continuous search spaces) a "score" of the potential point is estimated using one of the following methods (wherein the score tries to estimate the likelihood that a Cdriver will be called to pickup a hailing passenger, in each location under different conditions of supply, demand and/or any other relevant parameter):

1) the selection of these standpoints can be done by estimation of the probability that the Cdriver will be e-hailed in each point being considered. The top points in each area could then be selected. The probability of a pickup may be the integral of probabilities of each area taken from a Cdriver supply vs. demand model, such as described herein, wherein only areas within the radius of effective e-hailing being used by the transportation network should be considered in this integral and while locations of other Cdrivers within the same network should also be considered by dividing the probabilities of specific nodes which are being "shared" by more than one potential Cdriver. This can be done by first building a predictive model that estimates passenger pickup probabilities per area (as described in the Cdriver supply vs. demand model)

2) alternatively (or in combination with (1)), actual historical data may be used and/or a simulation, possibly using a Monte-Carlo simulation and/or other probabilistic generative models that allow running many simulations and estimating the score of each point, e.g. by running over perturbations of the history (such as in bootstrap sampling) of pickups and histories of other Cdrivers competing with the given Cdriver to be the closest Cdriver to the e-hailer, and comparing the average wait time of a driver in each location under different conditions, or the expected profit of the driver conditioned on waiting in different locations and a limited horizon.

3) a similar approach may be combined in which in real time the pickup probability is estimated in several candidate locations using real time supply and demand data.

The same method described here can also be performed using the profits of the drivers and the dropoffs in order to take into account in addition to the passenger pickup probabilities also expected (perhaps discounted) profits. In addition, in an e-hailing setting it is possible to model the expected pickup time of a passenger in each location/state in order to account for that in the value function (cost of time wasted until pickup).

According to some embodiments, a DDSS may include graphic processing circuitry functionally associated with a rendering module, adapted to derive and render graphic representations of: data collected by the DDSS, analysis and models derived by the DDSS from collected data and/or recommendations/conclusions derived by the DDSS from the data and/or models and analysis. According to some embodiments, graphic representations may include maps illustrating the data collected by the DDSS, analysis and models derived by the DDSS from collected data and/or recommendations/conclusions derived by the DDSS. For example, a DDSS client application may render upon a mobile device with which it is associated a map of the drivers current location and/or nearby area, including recommendations of driving directions or locations to stand at for optimal performance. The rendered display may further include expected wait times for next passenger (or some statistics of that distribution), expected profit for the next ride/hour in local currency, a star-rating or any other information related to the actions suggested by the DDSS. An example of such a display is presented in FIG. 5. As can be seen, in this exemplary display a Cdriver can see a map of the local area, including indications of locations of other drivers and an indication of the recommended action for the Driver: "stand at Dore St.". The map also includes an indication of the proper route to reach the desired location.

According to some embodiments, a DDSS may further include a Cdriver interface and/or fleet manager interface designed to allow the Cdriver and/or fleet manager to input one or more desired recommendation criteria/preferences/priorities by which to generate recommendations. Such an interface may further include options for the Cdriver and/or fleet manager to control operation and display of the DDSS (e.g. select display format).

The disclosure can be practiced by employing conventional tools, methodology and components. Accordingly, the details of such tools, component and methodology are not set forth herein in detail. In the previous descriptions, numerous specific details are set forth, in order to provide a thorough understanding of the disclosure. However, it should be recognized that the disclosure might be practiced without resorting to the details specifically set forth.

In the description and claims of embodiments of the disclosure, each of the words, comprise "include" and "have", and forms thereof, are not necessarily limited to members in a list with which the words may be associated.

Only exemplary embodiments of the disclosure and but a few examples of its versatility are shown and described in the disclosure. It is to be understood that the disclosure is capable of use in various other combinations and environments and is capable of changes or modifications within the scope of the concepts as expressed herein.

While certain features of the disclosure have been illustrated and described herein, many modifications, substitutions, changes, and equivalents will now occur to those skilled in the art. It is, therefore, to be understood that the appended claims are intended to cover all such modifications and changes as fall within the true spirit of the disclosure.

What is claimed is:

1. A mobile computing device comprising:
a display;
a driver interface adapted to receive a driver input of a driver associated with the mobile computing device, the driver input indicating one or more operational parameters for optimization of one or more of driver profit, fleet performance, average passenger wait time, or probability of arrival at a requested destination at a defined time; and
processor circuitry communicably coupled to the display and the driver interface, wherein the processor circuitry is to:
generate a first recommended driver action comprising driving directions for a route and a second recommended driver action, wherein the first recommended driver action and the second recommended driver action are optimized according to the one or more operational parameters, wherein the first recommended driver action and the second recommended driver action are at least partially based on a location signal indicating a current location of the driver;
determine a ranking of the first recommended driver action and the second recommended driver action; and
render on the display a graphic representation of the first recommended driver action and the second recommended driver action based on the ranking.

2. The mobile computing device of claim 1, wherein the first recommended driver action is also at least partially based on at least one of a live traffic feed indicating current traffic conditions within an area including the current location of the driver, a traffic flow model for the area, a transportation demand model of at least the area indicating a current demand for commercial transportation within the area, or a transportation supply model of the area indicating a current supply of commercial transportation within the area.

3. The mobile computing device of claim 1, wherein the optimization of the driver profit comprises optimizing profit per shift.

4. The mobile computing device of claim 1, wherein the optimization of the driver profit comprises optimizing profit of next fare.

5. The mobile computing device of claim 1, wherein the probability of arrival at the requested destination at the defined time comprises a first probability the driver arrives in a specific geographical region at the defined time.

6. The mobile computing device of claim 1, wherein the optimization of the fleet performance comprises optimizing profit of a fleet of commercial drivers.

7. The mobile computing device of claim 1, wherein the processor circuitry is further to calculate a second probability that a commercial driver is e-hailed at a given location.

8. The mobile computing device of claim 1, wherein the processor circuitry is further to calculate a third probability that a commercial driver is street hailed at a given location or navigating on a given route.

9. The mobile computing device of claim 8, wherein the processor circuitry is further to calculate, for each of a set of possible locations, a first probability the driver is hailed on route to each given location, aggregate a second probability of being e-hailed at each given location with the third probability the driver is street hailed on route to each given location into a fourth probability, and recommend an optimal location for the driver to drive to considering both of the first probability and the fourth probability.

10. A server computing device comprising:
memory; and
processor circuitry communicably coupled to the memory, the processor circuitry to:
generate a first recommended driver action and a second recommended driver action for a driver, wherein the first recommended driver action comprises driving directions for a route, wherein the first recommended driver action and the second recommended driver action are optimized according to one or more operational parameters indicated by the driver for optimization of one or more of driver profit, fleet performance, average passenger wait time, or probability of arrival at a requested destination at a defined time, and wherein the one or more operational parameters is at least partially based upon a location signal indicating a current location of the driver;
determine a ranking of the first recommended driver action and the second recommended driver action; and
transmit, to a client computing device of the driver, instructions to render a graphic representation of the first recommended driver action and the second recommended driver action based on the ranking at the client computing device.

11. The server computing device according to claim 10, wherein the memory stores the one or more operational parameters indicated by the driver in response to receiving the one or more operational parameters from the client computing device.

12. The server computing device according to claim 11, wherein the first recommended driver action is also at least partially based on data received from other mobile devices, a live traffic feed indicating current traffic conditions within an area including the current location of the driver, a traffic flow model for the area, a transportation demand model of at least the area indicating a current demand for commercial transportation within the area, or a transportation supply model of the area indicating a current supply of commercial transportation within the area.

13. The server computing device according to claim 11, wherein the optimization of the driver profit comprises optimizing at least one of profit per shift or profit of next fare.

14. The server computing device according to claim 11, wherein the processor circuitry is further to calculate a second probability the driver is e-hailed at a given location.

15. The server computing device according to claim 10, wherein the processor circuitry is further to calculate a third probability the driver is street hailed at a given location or cruising a given route.

16. The server computing device according to claim 15, wherein the processor circuitry is further to calculate first probability the driver is hailed on route to the given location, aggregate a second probability the driver is e-hailed at each given location with the third probability that the driver is hailed on route to each given location into a fourth probability, and recommend an optimal location for the driver to navigate to considering both the first probability and the fourth probability.

17. A method comprising:
receiving, by a processing device of a mobile computing device, a driver input of a driver associated with the mobile computing device, the driver input indicating one or more operational parameters for optimization of one or more of driver profit, fleet performance, average passenger wait time, or probability of arrival at a requested destination at a defined time;
generating, by the processing device, a first recommended driver action and a second recommended driver action, wherein the first recommended driver action comprises driving directions for a route, wherein generating the first recommended driver action and the second recommended driver action further comprises optimizing the first recommended driver action and the second recommended driver action according to the one or more operational parameters, wherein the first recommended driver action and the second recommended driver action are at least partially based upon a location signal indicating a current location of the driver;
determine a ranking of the first recommended driver action and the second recommended driver action; and
providing, via a user interface of the mobile computing device, a graphic representation of the first recommended driver action and the second recommended driver action based on the ranking.

18. The method of claim 17, wherein the first recommended driver action is further optimized at least partially based on at least one of a live traffic feed indicating current traffic conditions within an area including the current location of the driver, a traffic flow model for the area, a transportation demand model of at least the area indicating a current demand for commercial transportation within the area, or a transportation supply model of the area indicating a current supply of commercial transportation within the area.

19. The method of claim 17, wherein the one or more operational parameters are for the optimization of at least one of:
the driver profit by optimizing one or more of profit per shift or profit of next fare;
the probability of arrival at the requested destination at the defined time by optimizing a first probability that the driver arrives in a specific geographical region at the defined time; or
the fleet performance by optimizing profit of a fleet of commercial drivers.

20. The method of claim 17, further comprising:
calculating, for each of a set of possible locations, a first probability the driver is hailed on route to each given location;
aggregating a second probability of being e-hailed at each given location with a third probability the driver is street hailed on route to each given location into a fourth probability; and
recommending an optimal location for the driver to drive to considering both of the first probability and the fourth probability.

* * * * *